United States Patent
Wang et al.

(10) Patent No.: US 10,737,294 B2
(45) Date of Patent: Aug. 11, 2020

(54) ARTICLE WITH AESTHETIC SUBSTRATE

(71) Applicants: The Procter & Gamble Company, Cincinnati, OH (US); Institute of Chemistry Chinese Academy of Sciences, Beijing (CN)

(72) Inventors: Ping Wang, Beijing (CN); Libin Wang, Beijing (CN); Xu Huang, Beijing (CN); Yanlin Song, Beijing (CN); Fengyu Li, Beijing (CN); Peiyi Yong, Beijing (CN); Ce Tian, Beijing (CN); Heng Sun, Beijing (CN)

(73) Assignees: The Procter & Gamble Company, Cincinnati, OH (US); Institute of Chemistry Chinese Academy of Sciences, Beijing (CN)

( * ) Notice: Subject to any disclaimer, the term of this patent is extended or adjusted under 35 U.S.C. 154(b) by 226 days.

(21) Appl. No.: 15/880,661

(22) Filed: Jan. 26, 2018

(65) Prior Publication Data
US 2018/0264514 A1 Sep. 20, 2018

(30) Foreign Application Priority Data
Mar. 17, 2017 (WO) .......................... CN2017/077044

(51) Int. Cl.
*B05D 7/00* (2006.01)
*G02B 1/14* (2015.01)
(Continued)

(52) U.S. Cl.
CPC .................. *B05D 7/50* (2013.01); *B05D 1/12* (2013.01); *B05D 1/18* (2013.01); *B05D 1/28* (2013.01);
(Continued)

(58) Field of Classification Search
None
See application file for complete search history.

(56) References Cited

U.S. PATENT DOCUMENTS

| 2004/0096577 A1 | 5/2004 | Trinh |
| 2006/0123890 A1* | 6/2006 | Seo .......................... G01N 11/14 |
| | | 73/54.25 |

(Continued)

OTHER PUBLICATIONS

International Search Report dated Nov. 6, 2017, International App. No. PCT/CN2017/077044, 12 pgs.

(Continued)

*Primary Examiner* — Michael P. Rodriguez
(74) *Attorney, Agent, or Firm* — Sarah M DeCristofaro (57) ABSTRACT

A method of securing a layer of colloidal crystals to a substrate is provided, to enhance durability of an aesthetic effect provided by the colloidal crystals. The method involves depositing a layer of colloidal crystals formed of mono-dispersed particles on the substrate. Subsequently, a layer of water-borne coating is applied to the layer of colloidal crystals. To be effective, the water-borne coating should have a curing temperature that is less than the polymer glass transition temperature of the mono-dispersed particles forming the colloidal crystals. The water-borne coating penetrates through the colloidal crystals to the substrate thus retaining the colloidal crystals in place. The curing temperature of the water-borne coating ensures that the colloidal crystals are not damaged by the process for curing the coating.

14 Claims, 3 Drawing Sheets

(51) Int. Cl.
  *G02B 1/00* (2006.01)
  *B05D 1/12* (2006.01)
  *B05D 1/18* (2006.01)
  *B05D 1/28* (2006.01)
  *C09D 133/08* (2006.01)
  *C09D 175/14* (2006.01)

(52) U.S. Cl.
  CPC ......... *C09D 133/08* (2013.01); *C09D 175/14* (2013.01); *G02B 1/005* (2013.01); *G02B 1/14* (2015.01)

(56) References Cited

U.S. PATENT DOCUMENTS

| | | |
|---|---|---|
| 2006/0182968 A1 | 8/2006 | Yoshida et al. |
| 2010/0104810 A1 | 4/2010 | Fukazawa |
| 2010/0315703 A1 | 12/2010 | Purdy et al. |
| 2013/0208360 A1 | 8/2013 | Coggio et al. |
| 2014/0017145 A1* | 1/2014 | Aizenberg ........... G01N 21/774 422/425 |
| 2014/0193649 A1* | 7/2014 | Perrier-Cornet ........... B41J 2/32 428/451 |

OTHER PUBLICATIONS

Supplementary International Search Report, U.S. Appl. No. 15/880,661, dated Jun. 14, 2019, 7 pgs.

* cited by examiner

ARTICLE WITH AESTHETIC SUBSTRATE

TECHNICAL FIELD

The present invention relates to a method of securing a layer of colloidal crystals that provide an aesthetic benefit to a substrate, and to an article comprising a layer of colloidal crystals that provide an aesthetic benefit.

BACKGROUND

Colloidal crystals built up by mono-dispersed particles have been known to yield aesthetic effects as a result of the periodic arrangement of the mono-dispersed particles therein. Specifically, a plurality of mono-dispersed particles is assembled in a closely-packed and regularly-ordered structure to form a layer of colloidal crystals. This highly organized structure, with the size of the mono-dispersed particles in the range of wavelength of visible light, selectively diffracts certain wavelengths and therefore renders a color corresponding to the diffracted wavelengths. The aesthetic effects can be optimized by adjusting the refractive index in the structure, changing materials or particle sizes of the mono-dispersed particles, etc.

The colloidal crystals layer may be applied to the external surface of any number of different substrates to provide visual effects to different articles, such as products and/or packaging. However, such articles may be subjected to different forms of wear and tear that could damage the photonic crystal structures provided on their external surfaces. If the photonic crystal structure is disrupted through such wear and tear, the visual effects provided by the photonic crystals may be impaired.

US 2014/0193649 describes thermal printing of thermally printable photonic crystal materials as a means of providing security measures on articles. The process of thermally printing causes some disruption to photonic crystals printed on a substrate such that it is necessary to apply a coating to the photonic crystals to protect them from abrasive damage. The coating of US 2014/0193649 is chosen to have a relatively high thermal transition such that it can protect the photonic crystals while being subjected to high temperatures. However, the coating of US 2014/0193649 does not protect against other damage or displacement of the photonic crystals. For this, a fixing coating is used to improve the permanency of the photonic crystal structure and to avoid disruption of the photonic crystal structure when exposed to e.g., thermal stimuli. The fixing coating may include monomer, prepolymer and/or polymer, a cross-linking agent, and a polymerization initiator. However, while the fixing coating retains the formation of the photonic crystal, there is no mention of ways of ensuring the photonic crystal structures stay properly adhered to the substrate to which they are applied.

Thus, there is a need to provide a method for improving the endurance of photonic crystals when applied to different substrates.

SUMMARY

According to the present invention, there is provided a method of securing a layer of colloidal crystals to a substrate, comprising the steps of: a) depositing a layer of colloidal crystals formed of mono-dispersed particles on the substrate; and b) applying a water-borne coating to the layer of colloidal crystals, wherein the coating has a curing temperature less than the polymer glass transition temperature of the mono-dispersed particles. According to the present invention, there is further provided an article having a substrate on which a layer of colloidal crystals are formed and to which a water-borne coating is applied.

The water-borne coating trickles through gaps in the colloidal crystals to come into contact with the substrate, whereupon it sets retaining the colloidal crystals in place. The present inventors have discovered that using coatings other than a water-borne coating and/or using excessive heat to set the coating may impair the colour benefit and/or the structural integrity of colloidal crystals. For example, solvent coatings may dissolve/deteriorate the resultant colour of the colloidal crystals; polymer based solvent-free coatings typically have a high viscosity that would prevent them from trickling through the mono-dispersed particles; thermo-setting water-borne coatings typically require high temperatures to set that would damage any colour effect provided by the colloidal crystals and UV-curing coatings have a relatively strong acidity that may damage the colloidal crystals.

If the curing temperature of the coating is higher than the polymer glass transition temperature of the mono-dispersed particles, upon thermo-setting of the coating, the mono-dispersed particles will be softened and melted and the ordering structure of the colloidal crystals would be lost, thus impairing the visual benefit of the colloidal crystals. Preferably, the water-borne coating has a curing temperature of less than 150° C., 130° C., 115° C. to 100° C. In an embodiment, the curing temperature of the water borne coating is between 20° C. to 70° C. or 90° C., such that the water-borne coating may cure at room temperature.

In an embodiment, the mono-dispersed particles are arranged to form colloidal crystals having a particle size of between 100 nm, 120 nm, 130 nm or 150 nm to 350 nm, 500 nm, 100 nm 1500 nm or 2000 nm. In a preferred embodiment, the colloidal crystals have a particle size of between 150 nm to 360 nm. The size of the resultant colloidal crystals will, in part, determine the visual effect provided. For example, colloidal crystals having a size comparable with the wavelength of visible light can be used to provide different colours. If the mono-dispersed particles are too large, they will not provide the desired colour benefit and they may become brittle when set, even when a coating is used—thus making them liable to break off the substrate. Conversely, if the mono-dispersed particles are too small, there will not be sufficient gaps through which the water-borne coating may pass, thus preventing the water-borne coating from making contact with and adhering to the substrate.

Preferably, the layer of colloidal crystals has a thickness of from 100 nm, 500 nm, 1000 nm (/1 μm) or 5 μm to 50 μm, 200 μm, 500 μm or 1000 μm. In a preferred embodiment, the layer of colloidal crystals has a thickness of from 1 μm to 50 μm, or more preferably from 3 μm to 20 μm. If the layer of colloidal crystals is too thick, the water-borne coating will not be able to reach the substrate and thus would not provide adequate adhesion, whereas if the layer of colloidal crystals is too thin, any visual effect provided by the photonic crystal would be obscured by the water-borne coating. The mono-dispersed particles may be deposited using any known method, for example vertical deposition, dip coating, blade coating or spray coating.

The layer of water-borne coating may have a thickness of from 0.1 μm, 0.5 μm, 1 μm or 2 μm to 5 μm, 15 μm, 35 μm or 50 μm, as measured from the top of the colloidal crystals to the top of the layer of water-borne coating. In a preferred embodiment, the water-borne coating has a thickness of from 1 μm to 5 μm. If the layer of coating is too thin, there may be insufficient coating to penetrate to the substrate and coat the colloidal crystals and thus may not provide sufficient protection to the colloidal crystals. Alternatively, if the layer of coating is too thick, it may be too fragile and/or peel off.

The water-borne coating preferably comprises a dispersant and a binder. In embodiments, the dispersant has a solubility parameter δ of 1.5 $(J/cm^3)^{0.5}$ greater or smaller than that of the mono-dispersed particles (typically between 16 to 20 $(J/cm^3)^{0.5}$). In embodiments, the dispersant has a solubility parameter of greater than 22 $(J/cm^3)^{0.5}$, 23 $(J/cm^3)^{0.5}$ or 25 $(J/cm^3)^{0.5}$. The dispersant may be chosen from the group consisting of: water (47), methanol (30), ethanol (26), ethylene glycol (29). If the difference in solubility parameter of the dispersant and the mono-dispersed particles is less than 1.5 $(J/cm^3)^{0.5}$, then the water-borne coating may dissolve or swell the mono-dispersed particles upon contact. In both cases, the colour benefit of the mono-dispersed particles will be lost. Preferably, the solubility parameter of the dispersant should be greater than that of the mono-dispersed particles by at least 1.5 $(J/cm^3)^{0.5}$.

The binder may be one of a waterborne resin, coupling agent or biomaterial. In embodiments, the binder is a waterborne resin chosen from the group consisting of acrylic resin, polyurethane resin, epoxy resin, polyester, alkyd resin, amino resin, polyethylene pyrrolidone, silicone resin, dendrimer resin and composites. An acrylic resin may be chosen from, for example, epoxy acrylic resin, polyester acrylic resin, aliphatic acrylic resin, urethane acrylic resin or pure acrylic resin. The polyurethane resin may, for example, be acrylic polyurethane, aliphatic polyurethane, vinyl polyurethane or epoxy polyurethane. Epoxy resin may be, for example, aliphatic epoxy resin, BPA epoxy resin, acrylic epoxy resin, ethylene epoxy resin. Dendrimer resin may be polyamidoamine, dendronized alkyd, dendronized polyurethane, and derivatives thereof.

In alternative embodiments, the coupling agent is a silane coupling agent, for example, amino silane, diamino silane, epoxy silane, vinyl silane, alkyl silane, hydracyloxy silane, phenylsilane, silicate, tetraethyl orthosilicate, and derivates thereof or a titanate coupling agent, e.g. monoalkoxy titanates, chelate titanates, coordinate titanates, and derivatives thereof.

In further alternative embodiments, the binder is a biomaterial such as polypeptide, for example, silk fibroin or collagen or polysaccharide for example, chitosan, chitin, starch, cellulose, polylactic acid, shellac, and derivatives thereof.

In embodiments, the waterborne-coating may include one or more of the possible binders mentioned above. For example, in an embodiment, the binder may be a waterborne resin and the coating may further include a coupling agent as an additive.

In embodiments, the coating has a surface tension in the range of 20 mN/m, 22 mN/m, 24 mN/m or 25 mN/m to 40 mN/m, 50 mN/m, 60 mN/m or 70 mN/m. In a preferred embodiment, the coating has a surface tension of between 25 mN/m and 50 mN/m. If the surface tension is higher than 70 mN/m, the coating will not wet and penetrate the photonic crystals and it will not adhere to the substrate. By contrast, if the surface tension is lower than 20 mN/m, the coating will have a weak polarity and low solubility parameter, which will damage the colour of the colloidal crystals (as described above). To increase surface tension, the dispersant and/or additive may be chosen from a group having more polar groups, for example —OH, —COOH, —NH2, —CHO etc. To decrease surface tension, the dispersant and/or additive may be chosen from a group having more hydrophobic groups, for example —CHF, —CF2, —CF3, alkyl group, etc.

The method of applying the water-borne coating may comprise dip coating, spray coating, printing, blade coating, silk screen printing or brush painting. In the present invention, the water-borne coating may be self-drying or curable at a low-temperature, specifically less than 150° C., 130° C., 100° C. or 80° C., preferably between 60° C. and 80° C. In this respect, the colour effect of the photonic crystals may be compromised at temperatures above 150° C.

In embodiments, the substrate may be an organic or inorganic material. In embodiments having an organic substrate, the water-borne coating preferably comprises water-borne resin. In embodiments having an inorganic substrate, the water-borne coating preferably comprises a coupling agent.

In embodiments, the water-borne coating is a thermal curing coating comprising a low temperature initiator, wherein the initiator is selected from the group consisting of: UV initiator, azo initiator, peroxide initiator, redox initiator and derivatives thereof.

Preferably, the water-borne coating is a self-dry coating.

BRIEF DESCRIPTION OF THE DRAWINGS

While the specification concludes with claims, it is believed that the same will be better understood from the following description taken in conjunction with the accompanying drawings in which:

DETAILED DESCRIPTION

In the present invention, it has surprisingly been found that applying a water-borne coating that sets at a relatively low temperature over a layer of mono-dispersed particles deposited on a substrate improves the durability of the resultant colloidal crystals while maintaining any visual effect provided by the colloidal crystals. In this respect, the coating passes through gaps between adjacent crystals to make contact with the substrate, thus adhering the colloidal crystals to the substrate. Whereas other known coatings may damage the colloidal crystals during application or setting due to the high temperature required to set the coating or the acidic properties of the coating, water-borne coatings such as those described herein may be applied without having any impact on the visual benefit provided by the colloidal crystals.

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere of pressure and at about 50% relative humidity.

"Colloidal crystals" (or "photonic crystals"), as used herein refers to a coating layer generated by the periodic assembly of mono-dispersed particles, demonstrating a visible color attributable to light diffraction caused by its periodic structure. The term "mono-dispersed particles" herein refers to particles of a relatively uniform size, which form a periodic structure that selectively diffracts visible light of certain wavelengths and that therefore renders the colloidal crystals a visible color corresponding to the diffracted wavelengths. The mono-dispersed particles, as used herein, are made of polymers (e.g., polystyrene, polyacrylic acid) or inorganic materials (e.g., silica, titanium dioxide). In the colloidal crystal structure, the mono-dispersed particles are closely-packed and regularly-ordered, i.e., the particles are arranged in contact with one another to form the colloidal crystals. The colloidal crystal structure may be formed by directly depositing mono-dispersed particles onto a substrate or with aggregation of pre-assembled pellets of mono-dispersed particles.

"Polydispersity index (PDI)" as used herein is a parameter characterizing the distribution width of the particle sizes of the mono-dispersed particles. In the present invention, the PDI is tested according to method ISO 13321:1996E (1996) "Particle Size Analysis—Photon Correlation Spectroscopy". As the value decreases, the particles have more narrowly distributed particle sizes.

"Article", as used herein refers to an individual object for consumer usage, eg., a shaver, a toothbrush, a battery, or a container suitable for containing compositions. Preferably the article is a container, non-limiting examples of which include a bottle, a tottle, a jar, a cup, a cap, and the like. The term "container" is used to broadly include elements of a container, such as a closure or dispenser of a container. The compositions contained in such a container may be any of a variety of compositions including, but not limited to, detergents (e.g., laundry detergent, fabric softener, dish care, skin and hair care), beverages, powders, paper (e.g. tissues, wipes), beauty care compositions (e.g., cosmetics, lotions), medicinal, oral care (e.g., tooth paste, mouth wash), and the like. The container may be used to store, transport, or dispense compositions contained therein. Non-limiting volumes containable within the container are from 5 ml, 10 ml, 100 ml, 500 ml or 1000 ml to 1500 ml, 2000 ml or 4000 ml.

"Waterborne coating" as described herein means a coating having dispersant, such as water, methanol, ethanol or ethylene glycol, for example. The dispersant carries a binder chosen from one of a resin, coupling agent or biomaterial. A waterborne coating differs from a solvent based coating in that upon application, the liquid (mostly water or alcohol) evaporates, leaving behind microscopic particles of the binder. As the remnants of the liquid evaporate, capillary action draws the binder particles together, causing them to fuse and bind into a continuous, flexible film. Meanwhile, during curing and liquid evaporation, the binder materials crosslink together, forming three dimensional networks, which enable good coating performance, i.e. adhesion, durability.

Colloidal Crystals

Colloidal crystals built up by mono-dispersed particles have been known to yield color effects as a result of the periodic arrangement of the mono-dispersed particles therein. Specifically, a plurality of mono-dispersed particles having a wavelength in the range of visible light is assembled in a closely-packed and regularly-ordered structure to form colloidal crystals. This highly organized structure selectively diffracts certain wavelengths of light and therefore renders a color corresponding to the diffracted wavelengths. The color effects can be optimized by adjusting the refractive index in the structure, changing materials or particle sizes of the mono-dispersed particles, etc.

Of particular interest are colloidal crystals with relatively small refractive index differences that exhibit color, due to Bragg diffraction when the size of the colloid particles is comparable to the wavelength of the visible light.

Without being bound by theory, the choice of particle size dictates the range of wavelengths of visible light seen by human eyes when observing the substrate from different angles. This is in accordance with Bragg's law:

$$\lambda = 2n_{eff} d \sin \theta$$

here $\theta$ is the angle of diffractive light, corresponding to the viewing angle of observer.

For the colloidal crystals to be visible to a person viewing a surface at an angle of from 0° to 90°, the wavelength of reflection light of the colloidal crystals $\lambda$ should be in the range of 360 nm to 780 nm. Applying Bragg's law, if the particle size is large, long wavelength colour will be seen at a small viewing angle. If the particle size is small, short wavelength colour will be seen at a large viewing angle. For example, where red colour is desired, the particle size can be as large as 2000 nm such that the reflection wavelength of the colloidal crystals falls within the red range (at 780 nm) at a viewing angle of 10°. Alternatively, if purple is desired, the particle size can be as small as 100 nm, such that the reflection wavelength of the colloidal crystals falls in the purple range (approx. 360 nm) at a viewing angle of 90°.

In the present invention, the resultant colloidal crystals preferably have a size of between 100 nm and 2000 nm and a reflection peak wavelength in the visible range (determined by the viewing angle).

To form colloidal crystals as described above, the mono-dispersed particles used to form the colloidal crystals preferably have a particle size of from 100 nm, 120 nm, 130 nm or 150 nm to 350 nm, 500 nm, 100 nm 1500 nm or 2000 nm. In a preferred embodiment, the colloidal crystals have a particle size of between 150 nm to 360 nm. The color of formed colloidal crystals can be seen at normal viewing angle of 30°~90°.

In embodiments, the mono-dispersed polymer particles described herein have a PDI of below 0.5, preferably below 0.2, 0.1, 0.05 or 0.01. PDI is used to describe the size distribution of particles. The lower the PDI, the more ordered the resultant colloidal structure will be, diffracting light with a higher and narrower reflection spectrum, leading to a brighter iridescent effect and more purity of the individual colors. When the PDI is larger than 0.5, the presence of larger particles will disrupt the order structure of the colloidal crystals, and no structure color can be obtained.

Figure 1:
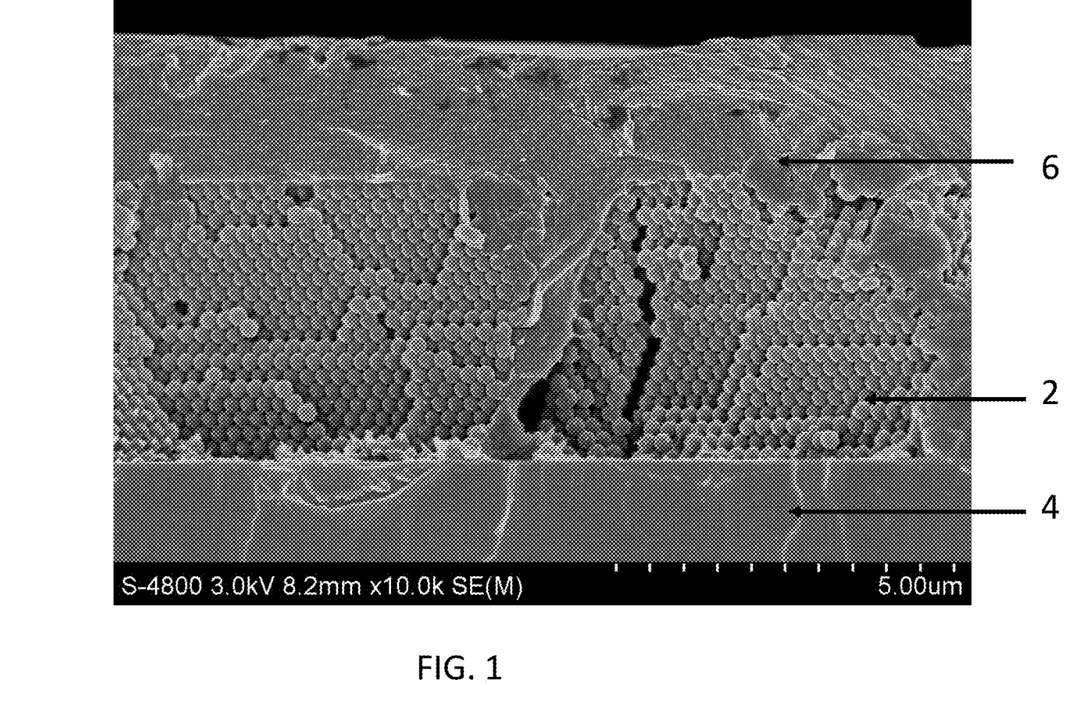
FIG. 1 shows an SEM image of a layer of colloidal crystals formed on a glass substrate to which a layer of water-borne coating has been applied.
Figure 2:
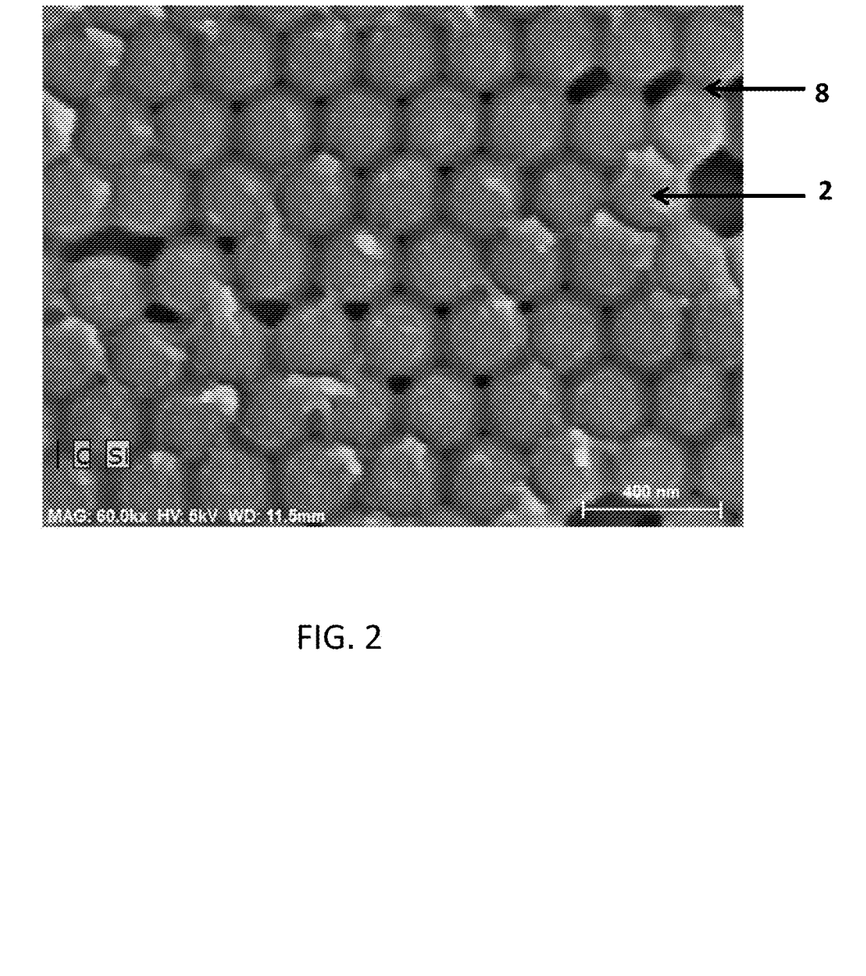
FIG. 2 shows an SEM image of a layer of colloidal crystal where a water-borne coating comprising a silicone resin can be seen surrounding individual colloidal crystals.
Figure 3:
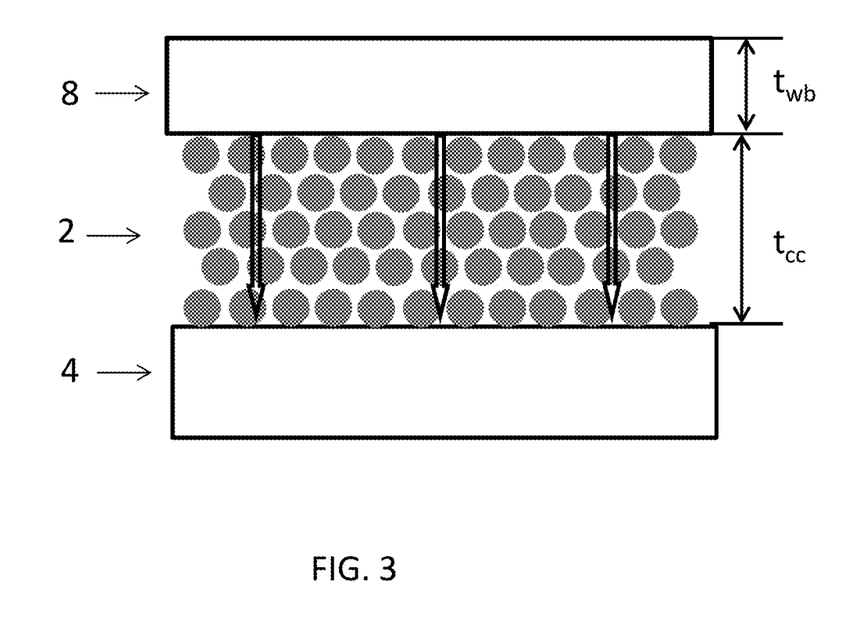
FIG. 3 shows a schematic illustrating the different layers and respective thicknesses.

The thickness of the layer of colloidal crystals has an impact on peak intensity and peak width, but not the reflection peak wavelength. However if, during application, the layer of colloidal crystals becomes too thick, defects may occur during assembly and the ordered structure may be compromised, thus lowering the peak intensity and providing large peak widths. The defects may also scatter light, resulting in a more whitish color. Thus, in a preferred embodiment, the colloidal crystal layer has a thickness of from 100 nm, 500 nm, 1000 nm (/1 μm) or 5 μm to 50 μm, 200 μm, 500 μm or 1000 μm. In a preferred embodiment, the layer of colloidal crystals has a thickness of from 1 μm to 50 μm, or more preferably from 3 μm to 20 μm. Below this level there are insufficient colloidal crystals to provide a colour effect, whereas above this level, the light reflected will be mainly white and the colour effect will be lost. Furthermore, above this level, the layer of colloidal crystals may be too thick for the waterborne coating to reach the substrate, therefore compromising the strength of fixation provided by the waterborne coating. If the layer of colloidal crystals is too thin, the colloidal crystal structure would be entirely encompassed by the waterborne coating and the colour effect may be lost. FIG. 1 is an SEM image showing the the arrangement of colloidal crystals 2 on a glass substrate 4, together with a waterborne coating 6. As can be seen in FIG. 1, the waterborne coating penetrates through cracks in the colloidal crystals to reach the substrate. FIG. 2 shows silicone 8 in the waterborne coating surrounding individual colloidal crystals. FIG. 3 illustrates the respective thicknesses of the different layers, where the thickness $t_{cc}$ of the colloidal crystals is measured as the distance between the average maximum distance of the top of the colloidal crystals to the substrate.

Waterborne Coating

The water-borne coating preferably comprises a dispersant and a binder. In embodiments, the dispersant has a solubility parameter δ of 1.5 $(J/cm^3)^{0.5}$ greater or smaller than that of the mono-dispersed particles (typically between 16 to 20 $(J/cm^3)^{0.5}$). In embodiments, the dispersant has a solubility parameter of greater than 22 $(J/cm^3)^{0.5}$, 23 $(J/cm^3)^{0.5}$ or 25 $(J/cm^3)^{0.5}$. The dispersant may be chosen from the group consisting of: water (47 $J/cm^3)^{0.5}$), methanol (30 $J/cm^3)^{0.5}$), ethanol (26 $J/cm^3)^{0.5}$), ethylene glycol (29 $J/cm^3)^{0.5}$). If the solubility parameter difference of the dispersant and the mono-dispersed particles is less than 1.5 $(J/cm^3)^{0.5}$, then the water-borne coating may dissolve or swell the mono-dispersed particles upon contact. In both cases, the colour benefit of the mono-dispersed particles will be lost. Preferably, the solubility parameter of the dispersant should be greater than that of the mono-dispersed particles by at least 1.5 $(J/cm^3)^{0.5}$.

The binder may be one of a resin, coupling agent or biomaterial. In embodiments, the binder is a resin chosen from the group consisting of acrylic resin, polyurethane resin, epoxy resin, polyester, alkyd resin, amino resin, polyethylene pyrrolidone, silicone resin, dendrimer resin and composites. An acrylic resin may be chosen from, for example, epoxy acrylic resin, polyester acrylic resin, aliphatic acrylic resin, urethane acrylic resin or pure acrylic resin. The polyurethane resin may, for example, be acrylic polyurethane, aliphatic polyurethane, vinyl polyurethane or epoxy polyurethane. Epoxy resin may be, for example, aliphatic epoxy resin, BPA epoxy resin, acrylic epoxy resin, ethylene epoxy resin. Dendrimer resin may be polyamidoamine, dendronized alkyd, dendronized polyurethane, and derivatives thereof.

In alternative embodiments, the coupling agent is a silane coupling agent, for example, amino silane, diamino silane, epoxy silane, vinyl silane, alkyl silane, hydracyloxy silane, phenylsilane, silicate, tetraethyl orthosilicate, and derivates thereof or a titanate coupling agent, e.g. monoalkoxy titanates, chelate titanates, coordinate titanates, and derivatives thereof.

In further alternative embodiments, the binder is a biomaterial such as polypeptide, for example, silk fibroin or collagen or polysaccharide for example, chitosan, chitin, starch, cellulose, polylactic acid, shellac and derivatives thereof.

In embodiments, the waterborne-coating may include one or more of the possible binders mentioned above. For example, in an embodiment, the binder may be a resin and the coating may further include a coupling agent as an additive.

In embodiments, the coating has a surface tension in the range of 20 mN/m, 22 mN/m, 24 mN/m or 25 mN/m to 40 mN/m, 50 mN/m, 60 mN/m or 70 mN/m. In a preferred embodiment, the coating has a surface tension of between 25 mN/m and 50 mN/m. If the surface tension is higher than 70, the coating will not wet and penetrate the photonic crystals and it will not adhere to the substrate. By contrast, if the surface tension is lower than 20, the coating will have a weak polarity and low solubility parameter, which will damage the photonic crystal colour (as described above). To increase surface tension, the dispersant and/or additive may be chosen from a group having more polar groups, for example —OH, —COOH, —NH2, —CHO etc. To decrease surface tension, the dispersant and/or additive may be chosen from a group having more hydrophobic groups, for example —CHF, —CF2, —CF3, alkyl group, etc.

The layer of water-borne coating may have a thickness $t_{wb}$ of from 0.1 μm, 0.5 μm, 1 μm or 2 μm to 5 μm, 15 μm, 35 μm or 50 μm, as measured from the top of the colloidal crystals to the top of the layer of water-borne coating, as shown in FIG. 3. If the layer of coating is too thin, there may be insufficient coating to penetrate to the substrate and coat the colloidal crystals and thus may not provide sufficient protection to the colloidal crystals. Alternatively, if the layer of coating is too thick, it may be too fragile and/or peel off.

The method of applying the water-borne coating may comprise dip coating, spray coating, printing, blade coating, silk screen printing or brush painting. In the present invention, the water-borne coating may be self-drying or curable at a low-temperature, specifically less than 150° C., 130° C., 100° C. or 80° C., preferably between 60° C. and 80° C. In this respect, the colour effect of the photonic crystals may be compromised at temperatures above 150° C.

Substrate

The substrate material may be any substrate typically used for packaging. For example, the substrate may be formed of glass, metal, ceramic, polymer, paper, fiber, wood, bamboo or a combination thereof. In an embodiment, the substrate is formed of glass selected from the group consisting of silicate glass, borate glass, phosphate glass and a combination thereof. Preferably the glass material is silicate glass or a derivative thereof, for example soda-lime silicate glass.

In an alternative embodiment, the substrate is formed of metal selected from the group consisting of aluminium, aluminium alloy, aluminium foil, stainless steel, low carbon steel, galvanized steel, tin plate, chrome plate and composites and derivates thereof. Preferably the substrate is formed of aluminium and/or derivatives thereof.

In a further embodiment, the substrate is formed of polymer selected from the group consisting of polyethylene (PE), polypropylene (PP), polyethylene terephthalate (PET), polyethylene therephthalate glycol (PETG), polystyrene (PS), polycarbonate (PC), polyvinyl chloride (PVC), polyvinyl dichloride (PVDC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBT), acrylonitrile styrene (AS), styrene butadiene copolymer (SBC) polyhydroxyalkanoates (PHA), polycaprolactone (PLC), polycyanoacrylate (PACA), polyhydroxybutyrate (PHB), copolymer of 1,3-propanediol and p-Phthalic acid, ethylene vinyl alcohol copolymer (EVOH), polymethyl methacrylate (PMMA), extrudable PET, ethylene (vinyl acetate (EV), ethylene/acrylic acid (EAA), ethylene/methyl acrylate (EMA), ethylene/ethyl acrylate (EEA), ethylene acrylic acid ionomers, cyclic olefin copolymers (COC), polyamides, thermal plastic elastomer (TPE), rubber and a combination thereof. Preferably, the substrate is formed of PET or derivatives thereof.

In an embodiment, the substrate is formed of paper selected from the group consisting of carton board, case board, corrugated paper and a processed paper thereof. Preferably, the substrate is formed of carton and/or a product processed thereof.

In another embodiment, the substrate is formed of fiber selected from the group consisting of natural silk, chemical fiber, cotton and a combination thereof.

In embodiments having an organic substrate, the water-borne coating preferably comprises polymer resin. In embodiments having an inorganic substrate, the water-borne coating preferably comprises a coupling agent.

In embodiments, the water-borne coating is a thermal curing coating comprising a low temperature initiator, wherein the initiator is selected from the group consisting of: UV initiator, azo initiator, peroxide initiator, redox initiator and derivatives thereof.

Treatment of Substrate

Treating the substrate helps increase the surface polarity and surface energy of substrate for better deposition of colloidal crystals (more ordered particle assembly and uniform deposition) and for enhanced adhesion of the water-borne coating to the substrate. Without being bound by theory, it is thought that colloidal particles will spread more evenly on a treated surface. Additionally, when the substrate is treated with higher polarity, more polar groups (—OH, —COOH, —NH2) form, which encourages more chemical/physical interaction with the coating which improves adhesion. Thus, in embodiments, the substrate may be treated with alkaline solution or acid solution; plasma treating, corona treating; flame treating; etching/erosion. Alternatively, a primer coating can be used to increase surface polarity, especially for very low polar substrates, e.g., PP or PE. Other industry known treatments of PP may also be used.

Additional Coatings

In embodiments, a top coat may be provided above the waterborne coating to further improve the durability of the colloidal crystals by decreasing surface polarity and increasing surface smoothness. The top coat may be any industry known top coat, for example, UV acrylate coating or methacrylate coating. As the waterborne coating is provided between the colloidal crystal layer and the top coat and does not come into direct contact with the colloidal crystals, there is greater flexibility in choice of top coat.

In embodiments where adhesion between the top coat and the waterborne coating is not optimal for example, if there is insufficient bonding between the layers, a further middle coating may be applied The middle coat may be selected from low temperature curing (<120° C.) coating or UV curing coating and can be solvent-based or a waterborne coating. Middle coatings such as those used in vacuum metallization may also be used.

The middle coating may be any industry known coating, for example, acrylic coating or polyurethane coating.

The middle and/or top coatings are preferably between 7 to 15 μm and may be applied using any known process, for example, spray painting, dip coating, roll coating, brush coating, printing etc.

Application of Mono-Dispersed Particles to a Substrate

In an embodiment, the mono-dispersed particles may be applied to the substrate by any known method, including vertical deposition, dip coating, spray painting, spin coating, blade coating, inkjet printing, water transfer printing, pad printing, silk screen printing and shear ordering method, spray drying method, powder spraying method. In a preferred embodiment, the mono-dispersed particles are applied to the substrate using vertical deposition. The typical process of vertical deposition is as follows:

prepare a suspension of mono-dispersed particles with a concentration of from 0.1% to 1% by weight in a container submerge the curve substrate vertically into the suspension without touching the inner wall of the container put the container in a chamber with controlled temperature of from 20° C. to 80° C. and humidity of from 20% to 80%.

Using this method, the solvent evaporates at the air-liquid-solid interface, causing the mono-dispersed particles in the suspension to self-assemble at the air-liquid-solid interface, thus forming colloidal crystal structures on the substrate. The preferred concentration of particle suspension is 0.5% by weight. The preferred chamber temperature and humidity are 80° C. and 80% respectively.

Methods

Structure Characterization

The structure of colloidal crystals and waterborne coating on a surface can be observed using a Scanning Electron Microscope (SEM) by scanning the side view of the samples microscopically. A HITACHI S-4800 SEM system is used herein. An SEM viewing sample is prepared by placing a piece of substrate with colloidal crystals and waterborne coating on a conductive adhesive. The viewing sample is photographed after depositing a film of platinum several nanometers thick thereto. An Energy Disperse Spectroscope (EDS) equipment can be integrated to SEM to detect the element of each layer.

Surface Tension Measurement

The surface tension for different coating liquid is measured by Kruss DSA100 with pedant drop mode referring to ISO 1409:2006. The pendant drop is the one most frequently used in drop shape method for surface tension measurement. In the pendant drop setup, a droplet of liquid (3 ul) is formed at the end of a needle (outside diameter 1.820 mm) by a syringe. The drop shape is captured by the camera and analyzed by the computer (by Drop Shape Analysis software) to calculate the surface tension.

Viscosity Test

The viscosity for waterborne coating liquid is measured by Digital viscometer SNB-1, referring to GB-T 10247-2008 at room temperature (18~23° C.). Put the rotor into 5~20 ml liquid and measure the twisting force of rotor when shearing in the liquid. The viscosity can be read directly on the screen of viscometer. No less than five measurements were taken at each temperature level for each sample.

Adhesion Test (Known as the "Grid Tape Test")

The coating adhesion is measured by tape test referring to ASTM D3359. The test method is described as below. 1) Place the specimen on a firm base and make cross-hatch cuts as follows: 11 cuts spaced 1.6 mm through the decoration to the substrate, and 11 cuts spaced 1.6 mm in a direction perpendicular to those already made. All cuts should be as long as possible with none longer than 19 mm. This forms a checkered pattern with 100 boxes. 2) After cutting, lightly brush the decoration with a soft brush to remove any detached or loosened material. 3) The Scotch Tape #616 or an equivalent is used. Place the center of the tape over the grid and smooth it down by finger pressure. 4) After at least 90 seconds since the application of the tape, pull the tape off as rapidly as possible while keeping it as close to an angle of 180° as possible. After pulling the tape from the surface, we inspect the grid area for removal of decoration from the substrate utilizing the illuminated magnifier. The evaluation criteria is that if less than 15% of the tested area is peeled off this is considered success, which means small flakes of the decoration are detached along the edge and at intersection of the cuts, the area affected is less than 15% of the grid. If more than 15% of the tested area peels off, this is considered to be a failure as the damage to the colour effect will likely be visible to the naked eye. 0% equates to zero damage to the photonic crystals (i.e., 100% of the grid remains intact).

Visual Assessment of Color

Colloidal crystal color is measured by visual assessment. Firstly, a picture of colloidal crystals without coating is taken in a lightbox under illumination of daylight. After applying coating, take pictures of colloidal crystals with coating in the lightbox under illuminant of daylight. Then, compare the color of colloidal crystals before and after coating. The color is defined by three parameters: lightness, chrome, and hue. The success criteria of color retained well is that the color hue is not changed, e.g. red is still red. When the color hue is changed, e.g. from red to white, or from red to transparent, we say the color is damaged.

Nail Scratch Test:

Scratch the surface of the test sample by fingernail for one time. The scratch length is at least 10 mm. Then observe the scratch line from one-arm distance (50 cm). The evaluation criteria is that the scratching line is unnoticeable.

EXAMPLES

Example

TABLE 1

Information for the layer of colloidal crystals

| | Material of mono-dispersed particles | Size of mono-dispersed particles | Thickness of colloidal crystals | Method for depositing particles | Process temperature & humidity |
|---|---|---|---|---|---|
| 1 | Poly(St-MMA-AA) | 260 nm | 3~4 μm | Dip coating | 50° C., 70% |
| 2 | | 250 nm | 4~6 μm | Vertical deposition | 80° C., 80% |
| 3 | | 260 nm | 4~6 μm | | |
| 4 | | 260 nm | 4~6 μm | | |
| 5 | | 260 nm | 4~6 μm | | |
| 6 | | 270 nm | 4~6 μm | | |
| 7 | | 210 nm | 4~6 μm | | |
| 8 | | 260 nm | 4~6 μm | | |
| 9 | | 250 nm | 4~6 μm | | |
| 10 | | 220 nm | 7~10 μm | | |
| 11 | | 260 nm | 5~7 μm | | |
| 12 | | 260 nm | 4~6 μm | | |
| 13 | | 260 nm | 4~6 μm | | |

TABLE 2

Information for the layer of protective waterborne coating

| | Coating trademark | Coating materials | Dispersant and solubility parameter | Surface tension of the coating | Thickness of the coating | Coating process | Curing temperature & time |
|---|---|---|---|---|---|---|---|
| 1 | Stahl PU112 | | Water, 47(J/cm$^3$)$^{0.5}$ | 37.15 mN/m | 0.5 μm | Spray coating | |
| 2 | | Epoxy silane coupling agent | | | 2 μm | Spray coating | 70° C., 20 min |
| 3 | | | | | 5 μm | Dip coating | |
| 4 | | | | | 2 μm | Spray coating | |
| 5 | Stahl PU114 | Amino silane coupling agent | Alcohol, 26(J/cm$^3$)$^{0.5}$ | 26.06 mN/m | 1 μm | Spray coating | 60° C., 15 min |
| 6 | KITO HOMAPU6105F | Polyurethane + epoxy silane coupling agent | Ethylene glycol, 29(J/cm$^3$)$^{0.5}$ | 41.56 mN/m | 12 μm | Brush painting | 70° C., 20 min |
| 7 | ICCAS 007/008 | Polyurethane acrylic resin | Water, 47(J/cm$^3$)$^{0.5}$ | 37.18 mN/m | 60 μm | Brush painting | Self-drying |
| 8 | | | | | 60 μm | Brush painting | |
| 9 | | | | | 80 μm | Dip coating | |
| 10 | | | | | 80 μm | Dip coating | |
| 11 | | | | | 80 μm | Dip coating | |

TABLE 2-continued

Information for the layer of protective waterborne coating

| | Coating trademark | Coating materials | Dispersant and solubility parameter | Surface tension of the coating | Thickness of the coating | Coating process | Curing temperature & time |
|---|---|---|---|---|---|---|---|
| 12 | Etercure 6770T-5F | Acrylic oligomer | Xylene, $18(J/cm^3)^{0.5}$ | 24.54 mN/m | 10 μm | Spray coating | UV curing, 10 min |
| 13 | Stahl PU112 | Epoxy silane coupling agent | Water, $47(J/cm^3)^{0.5}$ | 37.15 mN/m | 2 μm | Spray coating | 150° C., 10 min |

TABLE 3

Aesthetic Results of the multi-layer coating using the Grid tape test and a manual Colour Evaluation as described above.

| | Substrate and treatment | Colloidal crystals | Waterborne coating | Middle coat | Top coat | Grid tape test result | Colour evaluation | Other performance |
|---|---|---|---|---|---|---|---|---|
| 1 | Glass, treated by alkaline solution | Loose-packed assembly of particles | Stahl PU112 | No | No | 0% | Red before and after coating | NA |
| 2 | | Close-packed assembly of mono-dispersed Poly(St-MMA-AA) particles | | No | No | 0% | Red before and after coating. | NA |
| 3 | | | | ICCAS 007/008 | KDX PS1111-1 | 0% | Red before and after coating | Resistant to nail scratch |
| 4 | | | | No | Etercure 6770T-5F | 0% | Red before and after coating | Resistant to nail scratch |
| 5 | | | Stahl PU114 | No | No | 0% | Red before and after coating | NA |
| 6 | | | KITO HOMAPU6105F | No | No | 0% | Red before and after coating | NA |
| 7 | | | ICCAS 007/008 | No | No | 0% | Green before and after coating | NA |
| 8 | Glass without treating | | | No | No | 0% | Red before and after coating | NA |
| 9 | Glass, coated by primer of shellac | | | No | KDX PS1111-1 | 0% | Red before and after coating | Resistant to nail scratch |
| 10 | PP, treated by acid solution | | | No | KDX PS1111-1 | 0% | Green before and after coating | Resistant to nail scratch |
| 11 | PET, treated by alkaline solution | | | No | No | 0% | Red before and after coating | NA |
| 12 | Glass, treated by alkaline solution | | Etercure 6770T-5F | No | No | NA | Color disappeared after coating | NA |
| 13 | Glass, treated by alkaline solution | | Stahl PU112 | No | No | NA | Color disappeared after coating | NA |

As can be seen, in Example 12, where the solubility parameter of the waterborne coating is the same (18) as that of the colloidal crystals (18), the colloidal crystals are damaged. The particles of colloidal crystals are dissolved in the dispersant of waterborne coating, so the spherical morphology of the particles are damaged, and the ordered assembly structure cannot maintain. Likewise, in Example 13, where the curing temperature is higher than the glass transition temperature of the polymer particles forming the colloidal crystals, the resultant color effect is damaged.

Examples/Combinations

A. A method of securing a layer of colloidal crystals to a substrate, comprising the steps of:
   a) Depositing a layer of colloidal crystals formed of mono-dispersed particles on the substrate; and
   b) Applying a water-borne coating to the layer of colloidal crystals, wherein the coating has a curing temperature less than the polymer glass transition temperature of the mono-dispersed particles.
B. A method as described in paragraph A, further comprising the step of depositing mono-dispersed particles onto the substrate to form colloidal crystals.
C. A method as described in paragraph A, further comprising depositing pre-assembled pellets of mono-dispersed particles to the substrate to form colloidal crystals.
D. A method as described in paragraph A, wherein the water-borne coating has a curing temperature of less than 150° C.
E. A method as described in paragraph A, wherein the water-borne coating has a curing temperature of less than 90° C.
F. A method as described in paragraph A, further comprising the step of depositing mono-dispersed particles on the substrate to form the resulting colloidal crystal layer.
G. A method as described in paragraph F, wherein the mono-dispersed particles have a size of between 100 nm to 2000 nm.
H. A method as described in paragraph F, wherein the resulting colloidal crystals have a particle size of between 100 nm to 200 μm.
I. A method as described in paragraph A, wherein the layer of colloidal crystals has a thickness of from 100 nm to 1000 μm.
J. A method as described in paragraph A, wherein the layer of water-borne coating has a thickness of greater than 1 nm.
K. A method as described in paragraph A, wherein the layer of water-borne coating has a thickness of from 0.5 μm to 50 μm.
L. A method as described in paragraph A, wherein the water-borne coating comprises a dispersant having a solubility parameter $\delta_d$ and a solubility parameter $\delta_{md}$ of the mono-dispersed particles, wherein there is a difference of at least 1.5 $(J/cm^3)^{0.5}$ between $\delta_d$ and $\delta_{md}$.
M. A method as described in paragraph A, wherein the dispersant has a solubility parameter $\delta_d$ of greater than 22 $(J/cm^3)^{0.5}$.
N. A method as described in paragraph A, wherein the water-borne coating further comprises a binder selected from the group consisting of: a waterborne resin, a coupling agent or a biomaterial.
O. A method as described in paragraph A, wherein the water-borne coating has a surface tension in the range of from 20 to 70 mN/m.
P. A method as described in paragraph A, wherein the viscosity of the waterborne coating is in the range of from 1 mPa·s to 10000 mPa·s at −20° C. to 150° C.
Q. An article comprising:
   a) a substrate;
   b) a layer of colloidal crystals formed of mono-dispersed particles on the substrate;
   c) a layer of waterborne coating applied to the colloidal crystals, wherein the waterborne coating is cured at a temperature of less than the polymer glass transition temperature of the mono-dispersed.
R. An article as described in paragraph Q, wherein the layer of colloidal crystals has a thickness of from 100 nm to 1000 μm.
S. An article as described in paragraph Q, wherein the water-borne coating comprises a binder selected from the group consisting of: a waterborne resin, a coupling agent or a biomaterial.
T. An article as described in paragraph Q, wherein the substrate is formed of glass or plastic and the waterborne coating comprises a waterborne resin selected from the group consisting acrylic resin, polyurethane resin, and epoxy resin.
U. An article as described in paragraph Q, wherein the substrate is formed of glass, ceramic or metal, and the waterborne coating comprises one or more coupling agents selected from the group consisting of: silane coupling and titanate coupling agent.
V. An article as described in paragraph Q, wherein the substrate is formed of wood, fiber or paper and the waterborne coating comprises biomaterial selected from the group consisting of: shellac, cellulose and polypeptide.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of securing a layer of colloidal crystals to a substrate, comprising the steps of:
   a) depositing a layer of colloidal crystals formed of mono-dispersed particles on the substrate; and
   b) applying a water-borne coating to the layer of colloidal crystals, wherein the coating has a curing temperature less than the polymer glass transition temperature of the mono-dispersed particles, and wherein the water-borne coating penetrates through gaps in the layer of colloidal crystals to contact the substrate.

2. The method of claim 1, further comprising depositing pre-assembled pellets of mono-dispersed particles to the substrate to form colloidal crystals.

3. The method of claim 1, wherein the water-borne coating has a curing temperature of less than 150° C.

4. The method of claim 3, wherein the water-borne coating has a curing temperature of less than 90° C.

5. The method of claim 1, wherein the mono-dispersed particles have a size of between 100 nm to 2000 nm.

6. The method of claim 1, wherein the resulting colloidal crystals have a particle size of between 100 nm to 200 μm.

7. The method of claim 1, wherein the layer of colloidal crystals has a thickness of from 100 nm to 1000 μm.

8. The method of claim 1, wherein the layer of water-borne coating has a thickness of greater than 1 nm.

9. The method of claim 1, wherein the layer of water-borne coating has a thickness of from 0.5 μm to 50 μm.

10. The method of claim 1, wherein the water-borne coating comprises a dispersant, wherein the dispersant has a solubility parameter $\delta_d$ and the mono-dispersed particles has a solubility parameter $\delta_{dm}$, wherein there is a difference of at least 1.5 $(J/cm^3)^{0.5}$ between $\delta_d$ and $\delta_{md}$.

11. The method of claim 1, wherein the water-borne coating comprises a dispersant, and wherein the dispersant has a solubility parameter $\delta_d$ of greater than $22(J/cm^3)^{0.5}$.

12. The method of claim 1, wherein the water-borne coating further comprises a binder selected from the group consisting of: a waterborne resin, a coupling agent, or a biomaterial.

13. The method of claim 1, wherein the water-borne coating has a surface tension in the range of from 20 to 70 mN/m.

14. The method of claim 1, wherein the viscosity of the waterborne coating is in the range of from 1 mPa·s to 10000 mPa·s at −20° C. to 150° C.

* * * * *